(12) United States Patent
Sung et al.

(10) Patent No.: US 9,134,699 B2
(45) Date of Patent: Sep. 15, 2015

(54) APPARATUS AND METHOD FOR DISPLAYING HOLOGRAPHIC IMAGE USING COLLIMATED DIRECTIONAL BACKLIGHT UNIT

(75) Inventors: Gee Young Sung, Daegu-si (KR); Yun Tae Kim, Hwaseong-si (KR); Dong Kyung Nam, Yongin-si (KR); Seung Kyu Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 13/137,181

(22) Filed: Jul. 26, 2011

(65) Prior Publication Data

US 2012/0105929 A1    May 3, 2012

(30) Foreign Application Priority Data

Nov. 1, 2010    (KR) .......................... 10-2010-0107535

(51) Int. Cl.
| | |
|---|---|
| *G02B 5/32* | (2006.01) |
| *G03H 1/22* | (2006.01) |
| *G02F 1/1335* | (2006.01) |
| *F21V 8/00* | (2006.01) |

(52) U.S. Cl.
CPC .............. *G03H 1/2294* (2013.01); *G02B 5/32* (2013.01); *G02B 6/0038* (2013.01); *G02F 1/133615* (2013.01); *G03H 1/2286* (2013.01); *G03H 2001/2242* (2013.01); *G03H 2222/34* (2013.01); *G03H 2226/05* (2013.01)

(58) Field of Classification Search
CPC ....... G03H 1/268; G03H 1/2294; G03H 1/08; G02B 6/0038; G02B 6/0068; G02F 1/33615
USPC .......... 359/9, 23, 15; 349/65, 62; 362/32, 606
See application file for complete search history.

(56) References Cited

U.S. PATENT DOCUMENTS

| | | | |
|---|---|---|---|
| 4,834,476 A | 5/1989 | Benton | |
| 5,396,350 A * | 3/1995 | Beeson et al. | ................... 349/62 |
| 7,210,836 B2 * | 5/2007 | Sasagawa et al. | ............. 362/606 |
| 7,400,431 B2 * | 7/2008 | Schwerdtner et al. | .......... 359/23 |
| 7,535,607 B2 * | 5/2009 | Schwerdtner et al. | ............ 359/9 |
| 7,969,532 B2 * | 6/2011 | Mizushima et al. | ............ 349/65 |
| 8,294,966 B2 * | 10/2012 | Kroll et al. | ....................... 359/32 |
| 2010/0149611 A1 | 6/2010 | Leister | |
| 2010/0157026 A1 | 6/2010 | Reichelt | |
| 2010/0165430 A1 | 7/2010 | Buschbeck | |

FOREIGN PATENT DOCUMENTS

| | | |
|---|---|---|
| JP | 9-5672 | 1/1997 |
| JP | 11-14937 | 1/1999 |
| JP | 2002-49295 | 2/2002 |

(Continued)

*Primary Examiner* — Audrey Y Chang
(74) *Attorney, Agent, or Firm* — NSIP Law (57) ABSTRACT

A holographic three-dimensional (3D) image generating apparatus that may use a collimated directional backlight unit (CD BLU) is provided. The CD BLU may output a collimated light of which an emitting light is adjusted. The convergent lens may enable the outputted collimated light to converge into a viewing area of a viewer and thus, a viewing window may be generated. A spatial light modulator (SLM) may perform spatially-varying modulation with respect to the collimated light converging into the viewing area to generate a focused beam.

16 Claims, 6 Drawing Sheets

(56) References Cited

FOREIGN PATENT DOCUMENTS

| JP | 2004-506231 | 2/2004 | | | |
|----|----|----|----|----|----|
| JP | 2004-333880 | 11/2004 | | | |
| KR | 10-2000-0011458 | 2/2000 | | | |
| KR | 10-2001-0084238 | 9/2001 | | | |
| KR | 10-2004-0037446 | 5/2004 | | | |
| KR | 10-2007-0011121 | 1/2007 | | | |
| KR | 10-2009-0004931 | 1/2009 | | | |
| KR | 10-2009-0010775 | 1/2009 | | | |
| KR | 10-2010-0017609 | 2/2010 | | | |
| KR | 10-2010-0017871 | 2/2010 | | | |
| WO | WO 2008/092852 A1 | * | 8/2008 | ............... | G03H 1/22 |

* cited by examiner

APPARATUS AND METHOD FOR DISPLAYING HOLOGRAPHIC IMAGE USING COLLIMATED DIRECTIONAL BACKLIGHT UNIT

CROSS-REFERENCE TO RELATED APPLICATIONS

This application claims the priority benefit of Korean Patent Application No. 10-2010-0107535, filed on Nov. 1, 2010, in the Korean Intellectual Property Office, the disclosure of which is incorporated herein by reference.

BACKGROUND

1. Field

One or more example embodiments of the present disclosure relate to a holographic image displaying method and apparatus, and more particularly, to a holographic three-dimensional (3D) image generating method and apparatus using a flat panel display and the like.

2. Description of the Related Art

A holographic three-dimensional (3D) display apparatus may embody a 3D image without visual fatigue, using a liquid crystal display (LCD), a liquid crystal on silicon (LCOS), and the like.

The holographic 3D display apparatus may not use a view difference between two eyes as opposed to a stereoscopic display. Therefore, the holographic 3D display apparatus may embody a realistic stereoscopic image that does not cause a viewer to experience visual fatigue.

When the stereoscopic image is embodied, the holographic 3D display apparatus may use a great amount of data. The holographic 3D display apparatus may use a significantly small pixel pitch to increase a viewing angle for the stereoscopic image.

SUMMARY

An aspect of the present invention provides a holographic three-dimensional (3D) image generating apparatus and method that may use a collimated directional backlight unit (CD BLU).

Another aspect of the present invention provides a holographic 3D image generating apparatus and method that may adjust an emitting angle of a collimated light to generate a viewing window appropriate for a location of a viewer.

The foregoing and/or other aspects are achieved by providing a holographic 3D image apparatus for generating a holographic 3D image, the apparatus including a CD BLU to output a first collimated light, a convergent lens to enable the first collimated light to converge into a viewing area of a viewer of the holographic 3D image, and to form a viewing window, and a spatial light modulator (SLM) to display a holographic image pattern obtained by combining diffractive lenses, and the CD BLU adjusts an emitting angle of the first collimated light, and the holographic image pattern performs spatially-varying modulation with respect to the first collimated light converging into the viewing area to generate a focused beam.

The apparatus may further include a controller to control the CD BLU to adjust the emitting angle of the first collimated light, and the controller may adjust the emitting angle of the first collimated light to enable the modulated light wave to be emitted towards a location of at least one eye of the viewer.

The apparatus may further include a tracking unit to track the location of the at least one eye to generate information to be used for identifying the location of the at least one eye, and the tracking unit may provide the controller with the information to be used for identifying the location of the at least one eye.

The CD BLU may include a light source to emit light, a collimating lens to collimate the light emitted by the light source to output a second collimated light, a collimated light deflection device to deflect a second collimated light to output a third collimated light, and a patterned BLU to reflect the third collimated light to output the first collimated light, and wherein the collimated light deflection device may adjust an incident angle of the third collimated light to the pattern BLU by changing a shape or a spatial-location of the collimated light deflection device.

The collimated light deflection device may be at least one of a rotation prism, electro-wetting prism, and a liquid crystal.

A midpoint of a range of emitting angles of the first collimated light may be perpendicular to a midpoint of a range of incident angles of the third collimated light.

The apparatus may include two light sources, two collimating lenses, and two collimated light deflection devices, a first incident angle adjusting unit comprising a first light source, a first collimating lens, and a first collimated light deflection device, and a second incident angle adjusting unit including a second light source, a second collimating lens, and a second collimated light deflection device. In this example, the first incident angle adjusting unit and the second incident angle adjusting unit may be located symmetrically with respect to the patterned BLU.

The first light source and the second light source, respectively, may emit light by performing time division with respect to the first light source and the second light source.

The first incident adjusting unit may control the emitting angle of the first collimated light to enable the focused beam to be emitted towards a location of an eye of the viewer, and the second incident adjusting unit may control the emitting angle of the first collimated light to enable the focused beam to be emitted towards a location of the other eye of the viewer.

The convergent lens may be at least one of a refractive lens and a diffractive lens.

The foregoing and/or other aspects are achieved by providing a holographic (3D) image generating method, the method including outputting a collimated light of a predetermined emitting angle, enabling the collimated light to converge into a viewing area of a viewer of the holographic 3D image, displaying a holographic image pattern obtained by combining diffractive lenses, and emitting a focused beam, the focused beam being generated by performing, based on the holographic image pattern, spatially-varying modulation with respect to the collimated light converging into the viewing area, and the emitting light of the collimated light may be adjustable, and the holographic image pattern may perform the spatially-varying modulation with respect to the collimated light converging into the viewing area to generate the focused beam.

The method may further include controlling the emitting angle to enable the modulated light wave to be emitted towards a location of at least one eye of the viewer.

The method may further include tracking the location of the at least one eye to generate information to be used for identifying the location of the at least one eye, and the information to be used for identifying the location of the at least one eye may be used when the controlling of the emitting angle is performed.

The outputting may include emitting light using a light generating device, generating a collimated light by collimating the light emitted by the light generating device, deflecting the collimated light, and outputting the collimated light at the emitting angle by reflecting the deflected collimated light, and the deflecting may adjust an incident angle of the deflected collimated light to a collimated light reflection device by changing a shape or a spatial-location of a collimated light deflection device.

The deflecting may control the incident angle of the deflected collimated light to the collimated light reflection device by applying at least one of a mechanical and an electrical action to the collimated light reflection device.

The midpoint of a range of emitting angles of the reflected collimated light may be perpendicular to a midpoint of a range of incident angles of the deflected collimated light.

A holographic 3D image apparatus may include two light generating devices, two collimated light generating devices, and two collimated light deflection devices, a first collimated light generated by a first light generating device and a first collimated light generating device, and a second collimated light generated by a second light generating device and a second collimated light generating device facing each other.

The first incident adjusting device may include the first light generating device, the first collimated light generating device, and a first collimated light deflection device, the second incident adjusting device may include the second light generating device, the second collimated light generating device, and a second collimated light deflection device. In this example, the first collimated light and the second collimated light may be alternately emitted by performing time division with respect to the first incident angle adjusting device and the second incident angle adjusting device.

The first collimated light deflection device may adjust the incident angle of the deflected collimated light to the collimated light reflection device to enable the focused beam to be emitted towards the location of an eye of the viewer, and the second collimated light deflection device may adjust the incident angle of the deflected collimated light to the collimated light reflection device to enable the focused beam to be emitted towards the location of the other eye of the viewer.

The foregoing and/or other aspects are achieved by providing a holographic 3D image apparatus for generating a holographic 3D image. The holographic 3D image apparatus includes a collimated directional backlight unit (CD BLU) to output a collimated light, a convergent lens to form a viewing window at a predetermined location by converging the collimated light outputted from the CD BLU at the predetermined location, and a spatial light modulator (SLM) to display a holographic image pattern that generates a focused beam by performing spatially-varying modulation with respect to the collimated light converged at the predetermined location.

The foregoing and/or other aspects are achieved by providing a holographic 3D image apparatus for generating a holographic 3D image. The holographic 3D image apparatus includes a tracking unit to track a location of an eye of a viewer viewing the 3D holographic image, a collimated directional backlight unit (CD BLU}, including a light source and a collimating lens, to output a collimated light, a convergent lens to form a viewing window at a predetermined location by converging the collimated light outputted from the CD BLU at the predetermined location based on the tracked location of the eye of the viewer, a spatial light modulator (SLM) to display a holographic image pattern that generates a focused beam by performing spatially-varying modulation with respect to the collimated light converged at the predetermined location, and a controller to control an emitting angle of the collimated light outputted from the CD BLU based on the tracked location of the eye of the viewer.

The foregoing and/or other aspects are achieved by providing a method of generating a holographic 3D image. The method includes tracking a location of an eye of a viewer viewing the 3D holographic image, outputting collimated light at an emitting angle based on the tracked location of the eye of the viewer, forming a viewing window at a predetermined location by converging the output collimated light at the predetermined location based on the tracked location of the eye of the viewer, and displaying a holographic image pattern that generates a focused beam by performing spatially-varying modulation with respect to the collimated light converged at the predetermined location.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
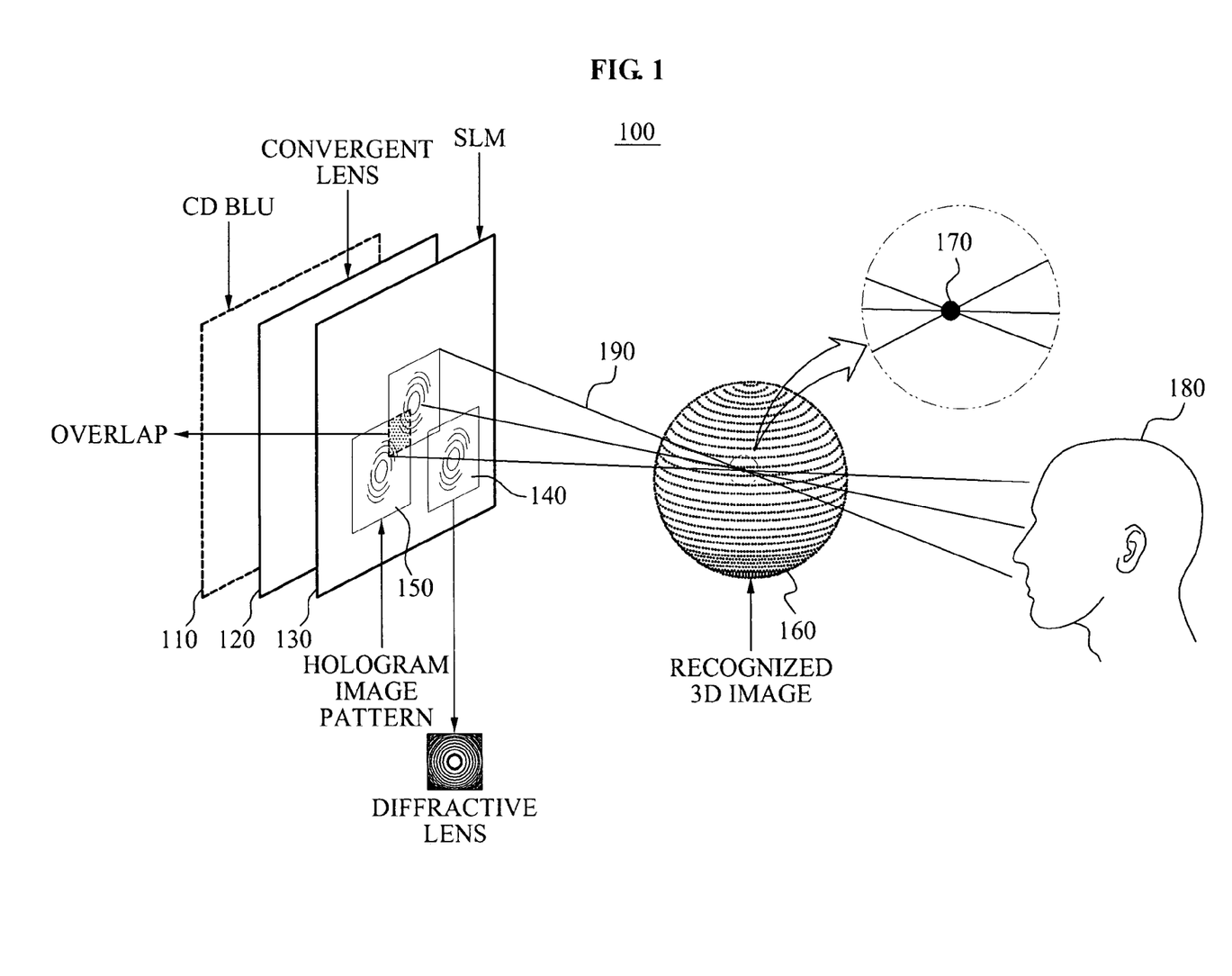
FIG. 1 illustrates a configuration and a principle of operations of a holographic three dimensional (3D) image apparatus according to example embodiments.

FIG. 1 illustrates a configuration and a principle of operations of a holographic three-dimensional (3D) image apparatus 100 according to example embodiments.

The holographic 3D image apparatus 100 may include, for example, a collimated directional backlight unit (CD BLU) 110, a convergent lens 120, and a spatial light modulator (SLM) 130.

The CD BLU 110 may provide a collimated directional ray, that is, the CD BLU 110 may output a collimated light.

The convergent lens 120 may enable the collimated light outputted from the CD BLU 110 to converge to a location where a viewer 180 views a 3D image and thus, a viewing window may be formed.

A refractive lens or a diffractive lens may be used as a convergent lens.

The SLM 130 may display a holographic image pattern 150. For example, the holographic image pattern 150 may be an interference pattern obtained when images from diffractive lenses or sub-holograms are combined and/or overlap with each other.

The diffractive lens 140 may output a single point of a 3D object 160 recognized by the viewer 180.

The holographic image pattern 150 may perform spatially-varying modulation with respect to a first collimated light that is outputted from the convergent lens 120 and that converges into a viewing area, and thus, may generate a focused beam 190. The focused beam 190 may focus on a point 170 in space.

The SLM 130 may express amplitude and a phase of the focused beam 190 based on the holographic image pattern.

Figure 2:
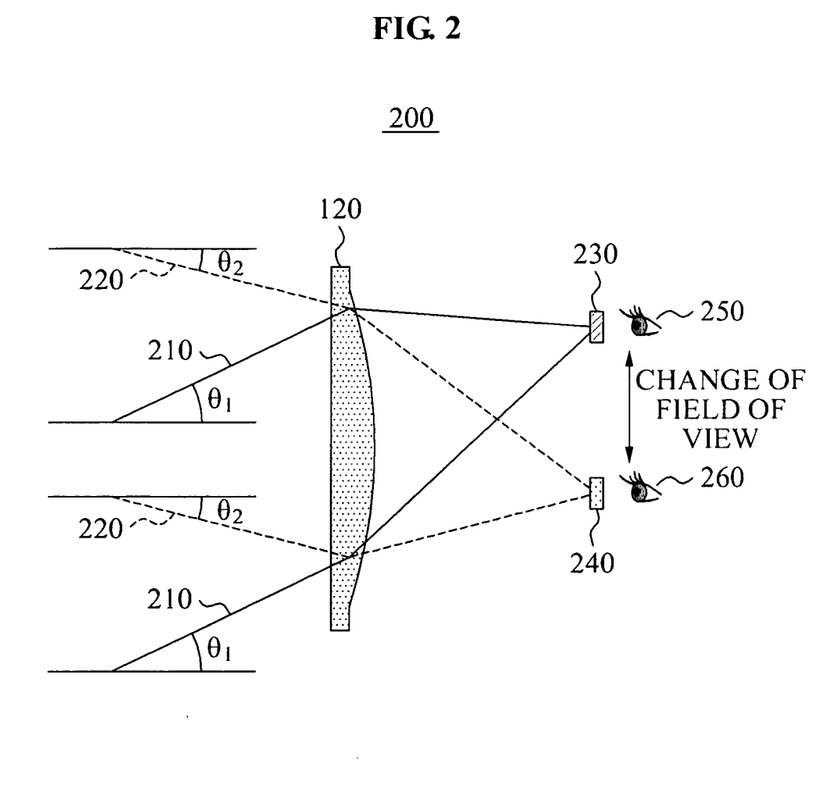
FIG. 2 illustrates a process that generates a viewing window according to example embodiments.

FIG. 2 illustrates a process that generates a viewing window according to example embodiments.

A first collimated light 210 and a second collimated light 220 may be a collimated directional ray outputted from the CD BLU 110. An emitting angle of the first collimated light 210 may be $\theta_1$, and an emitting angle of the second collimated light 220 may be $\theta_2$.

The first collimated light 210, which is expressed in FIG. 2 by a line, may pass through the convergent lens 120 and may converge into a viewing area of a viewer at a first location 250. When the first collimated light 210 passes through the convergent lens 120, the first collimated light may generate a first viewing window 230 for the first location 250.

When a field of view is changed as the viewer moves from the first location 250 to a second location 260, the location of the first viewing window 230 may be changed.

The second collimated light 220, which is expressed in FIG. 2 by a dotted line, may pass through the convergent lens 120, and may generate a second viewing window 240 for the second location 260.

Therefore, when the CD BLU 110 outputs a collimated light (a collimated directional ray) of which an emitting angle is adjusted based on the location of the field of view, a holographic image (a viewing window) adjusted based on the location of the field of view may be generated.

A size of the first viewing window 230 and a size of the second viewing window 240 may be determined based on a size of a pupil of the viewer.

Figure 3:
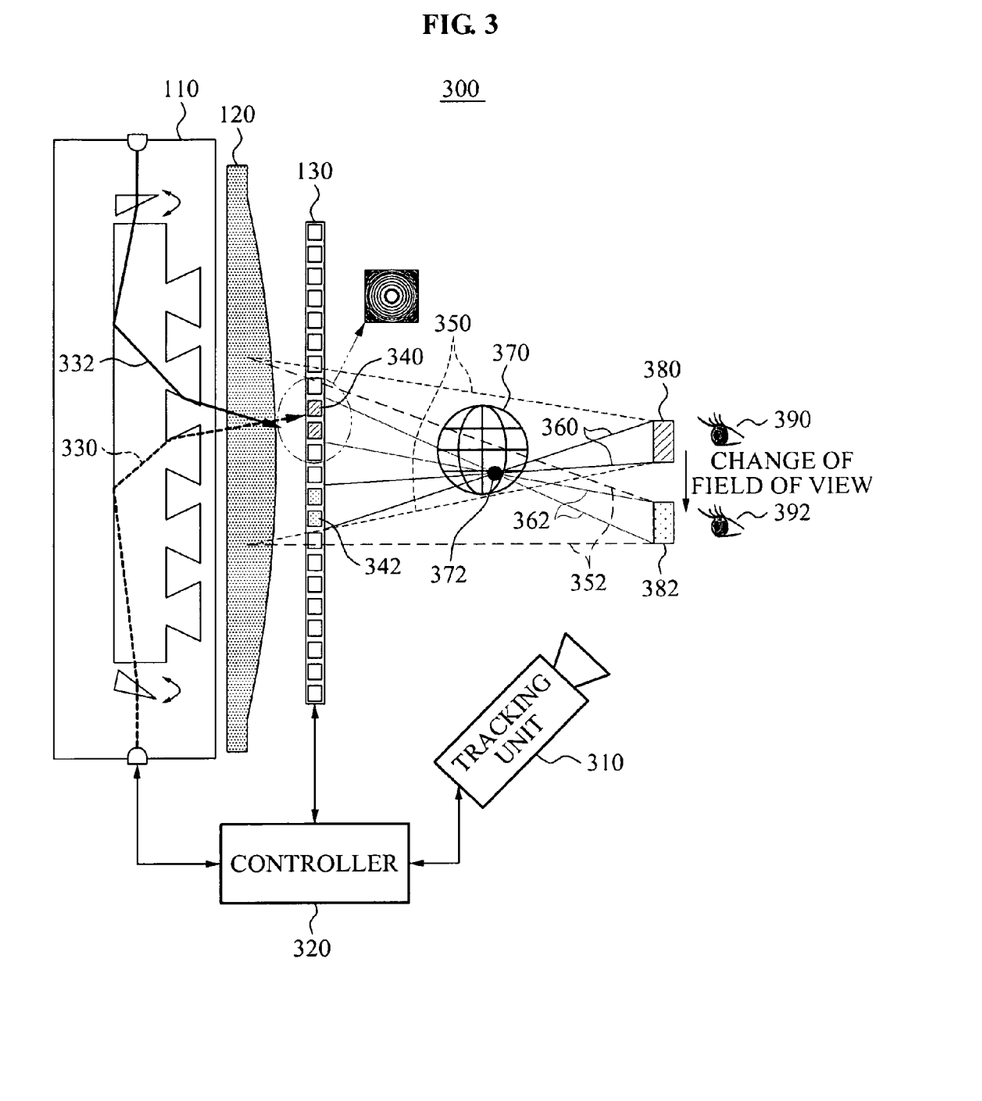
FIG. 3 illustrates a configuration and a principle of operations of a holographic 3D image apparatus according to example embodiments.

FIG. 3 illustrates a configuration and a principle of operation of a holographic 3D image apparatus 300.

The holographic 3D holographic image apparatus 300 may include, for example, the CD BLU 110, the convergent lens 120, and the SLM 130, and may further include a tracking unit 310 and a controller 320.

The tracking unit 310 may track a location of at least one eye of a viewer viewing a 3D holographic image, and may generate information to be used for identifying the location of the at least one eye. The tracking unit 310 may track respective locations of the at least one eye of the viewer.

The controller 320 may control the CD BLU 110, and may adjust an emitting angle of a collimated light outputted from the CD BLU 110. The controller 320 may adjust the emitting angle of the collimated light outputted from the CD BLU 110 and thus, may enable a light wave modulated by the SLM 130 to be emitted towards the location of the at least one eye of the viewer.

The controller 320 may receive, from the tracking unit 310, the information to be used for identifying the location of the at least one eye of the viewer, that is, information to be used for identifying a field of view.

When the at least one eye of the viewer is located in a first location 390, the tracking unit 310 may transmit, to the controller 320, information to be used for identifying the first location 390.

The SLM 130 may display sub-holograms to enable a 3D hologram appropriate for the field of view to be generated. The SLM 130 may generate the sub-holograms with respect to the field of view and thus, an amount of calculation to create 3D hologram may be reduced.

A location of the sub-holograms in the SLM 130 may be determined based on the field of view and a shape of a 3D hologram to be outputted.

The SLM 130 may receive, from the controller 320, information associated with the field of view, that is, a changed location of a user, and information associated with the 3D hologram to be generated, and may generate, based on the above information, the information associated with the sub-holograms to be displayed, for example, a location of the sub-holograms and an image pattern.

The SLM 130 may display the sub-holograms based on the information associated with the generated sub-holograms.

The controller 320 may generate, based on the field of view and the information associated with the 3D hologram to be generated, the information associated with the sub-holograms to be displayed on the SLM 130. The controller 320 may provide the generated information to the SLM 130. The SLM 130 may display the sub-holograms, based on the information associated with the sub-holograms.

The CD BLU 110 may output a first collimated light 330 based on a control of the controller 320.

The first collimated light 330 may converge into a first viewing area 380 through the convergent lens 120.

The SLM 130 may display a first sub-hologram 340 to generate the 3D hologram.

The first sub-hologram 340 may perform spatially-varying modulation with respect to the first collimated light 350 converging into the first viewing area 380, to generate a first focused beam 360.

The first focused beam 360 may generate a point 372 of a 3D object 370.

When at least one eye of a viewer moves from the first location 390 to a second location 392, a 3D hologram appropriate for the new location, that is, a 3D hologram appropriate for the second location 392, may be generated.

The movement may be an assumption to provide the 3D hologram to at least one eye of the viewer, based on time division. The first location 390 may denote a location of a right eye of the viewer and the second location 392 may denote a location of a left eye of the viewer.

The tracking unit 310 may transmit, to the controller 320, information to be used for identifying the second location 392.

The CD BLU 110 may output a second collimated light 332 of which an emitting angle is changed. The emitting angle is changed based on a control of the controller 320.

The second collimated light 332 may converge into a second viewing area 382 through the convergent lens 120.

The SLM 130 may display a second sub-hologram 342 to generate the 3D hologram.

The second sub-hologram 342 may perform spatially-varying modulation with respect to the second collimated light 352 converging into the second viewing area 382, to generate a second focused beam 362.

The second focused beam 362 may generate the point 372 of the 3D object 370.

A collimated light outputted from the CD BLU 110 may be a collimated directional ray. Accordingly, the convergent lens 120 may be closely located to the CD BLU 110. Therefore, the holographic 3D image apparatuses 100 and 300 may include a slim form factor.

As described above, the holographic 3D image apparatus may generate a 3D hologram based on a location of the viewer using an eye tracking scheme.

Figure 4:
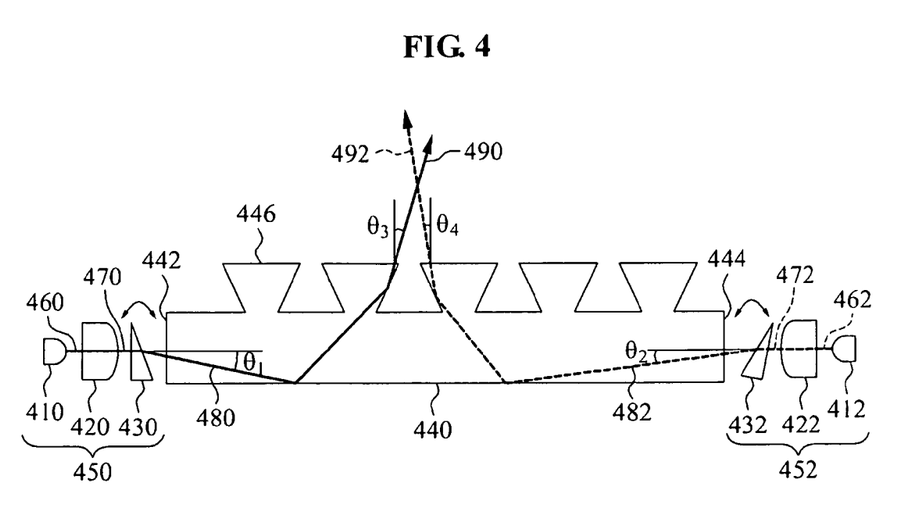
FIG. 4 illustrates a configuration of a collimated directional backlight unit (CD BLU) according to example embodiments.

FIG. 4 illustrates a configuration of the CD BLU 110 according to example embodiments.

The CD BLU 110 may include a light source, for example, light sources 410 and 412, a collimating lens, for example, collimating lenses 420 and 422, a collimated light deflection device, for example, collimated light deflection devices 430 and 432, and a patterned BLU, for example a pattern BLU 440.

The patterned BLU 440 may include a first opening hole, for example, first opening holes 442 and 444, to which a collimated light is projected, and a second opening hole, for example, a second opening hole 446. The second opening hole 446 may have a trapezoidal shape. The patterned BLU 440 may include a plurality of first opening holes and a plurality of second opening holes.

A first collimated light that is an output of the CB BLU 110, for example, a first collimated light 490 and a first collimated light 492, may be outputted from the second opening hole.

The light source, the collimating lens, and the collimated light deflection device may be located on a left side and a right side of the patterned BLU 440.

A first incident angle adjusting unit 450 may include the light source 410, the collimating lens 420, and the collimated light deflection device 430, which are located on the left side.

A second incident angle adjusting unit 452 may include the light source 412, the collimating lens 422, and the collimated light deflection device 432, which are located on the right side.

The first incident angle adjusting unit 450 and the second incident angle adjusting unit 452 may be located symmetrically with respect to the patterned BLU 440.

The light source may emit light, for example, a light 460 and a light 462.

The collimating lens may collimate the light emitted from the light source and may output a second collimated light, for example, a second collimated light 470 and a second collimated light 472.

The collimated light deflection device may deflect the second collimated light and may output a third collimated light, for example, a third collimated light 480 and a third collimated light 482. The third collimated light may be projected to the first opening holes of the patterned BLU 440.

The collimated light deflection device may be at least one of a rotation prism, an electro-wetting prism, and a liquid crystal. The rotation prism may mechanically rotate to deflect the second collimated light. The electro-wetting prism and the liquid crystal may electrically deflect the second collimated light.

The collimated light deflection device may mechanically/electrically change a spatial-location or a shape of the collimated light deflection device and thus, an incident angle, for example, $\theta_1$ and $\theta_2$, of the third collimated light to the patterned BLU 440 may be adjusted.

For example, when the collimated light deflection device is the rotation prism, the incident angle of the third collimated light may be changed based on an angle of rotation prism.

The patterned BLU 440 may reflect the incident 3D collimated light inside the patterned BLU 440 and may output the first collimated light via the second opening hole.

The patterned BLU 440 may output the first collimated light when the incident angle of the incident third collimated light is within a predetermined range. However, when the incident angle of the third collimated light is beyond the predetermined range, the incident third collimated light may be absorbed inside the patterned BLU 440 or may be reflected via the first opening holes.

An emitting angle, for example, $\theta_3$ and $\theta_4$, of the first collimated light may be determined based on the incident angle of the third collimated light.

The controller 320 or the CD BLU 110 may control the collimated light deflection device to adjust the incident angle of the third collimated light and thus, may obtain the emitting angle of the first collimated light.

When the plurality of second opening holes is included, the second opening holes respectively output the first collimated lights of the same emitting angle.

The patterned BLU 440 may reflect the incident third collimated light without loss of quantity of light or with a relatively small loss of quantity of light, to output the reflected third collimated light as the first collimated light. Therefore, the light emitted from the light source may not suffer a loss or may suffer a relatively small loss and thus, the holographic 3D image apparatuses 100 and 300 may provide a 3D image with a high luminance.

The first incident angle adjusting unit 450 and the second incident angle adjusting unit 452 may be located on either or both sides of the patterned BLU 440. The first incident angle adjusting unit 450, the second incident angle adjusting unit 452, and the patterned BLU 440 may be in the form of an edge.

A midpoint of a range of emitting angles of the first collimated light may be perpendicular to a midpoint of a range of incident angles of the third collimated light.

Therefore, the CD BLU 110 and the holographic 3D image apparatuses 100 and 300 may have a slim form factor.

The first incident angle adjusting unit 450 and the second incident angle adjusting unit 452 may operate by performing a time division. For example, the first light source 410 and the second light source may emit light during different time slots as part of a time division scheme.

For example, the first incident angle adjusting unit 450 may generate a viewing window for a left eye of a viewer, and the second incident angle adjusting unit 452 may generate a viewing window for a right eye of the viewer. The collimated lights that are expressed by a line, for example, the collimated lights 470, 480, and 490, and the collimated lights that are expressed by a dotted line, for example, the collimated light 472, 482, and 492 may be alternately outputted or may provide respective 3D holograms to at least the one eye of the user.

Therefore, the first incident angle adjusting unit 450 or the first collimated light deflection device 430 may adjust $\theta_3$ of the first collimated light 490 to enable the modulated light wave to be emitted towards a location of an eye of the viewer, and the second incident angle adjusting unit 452 or the first collimated light deflection device 432 may adjust $\theta_4$ of the first collimated light 492 to enable the modulated light wave to be emitted towards a location of the other eye of the viewer.

Figure 5:
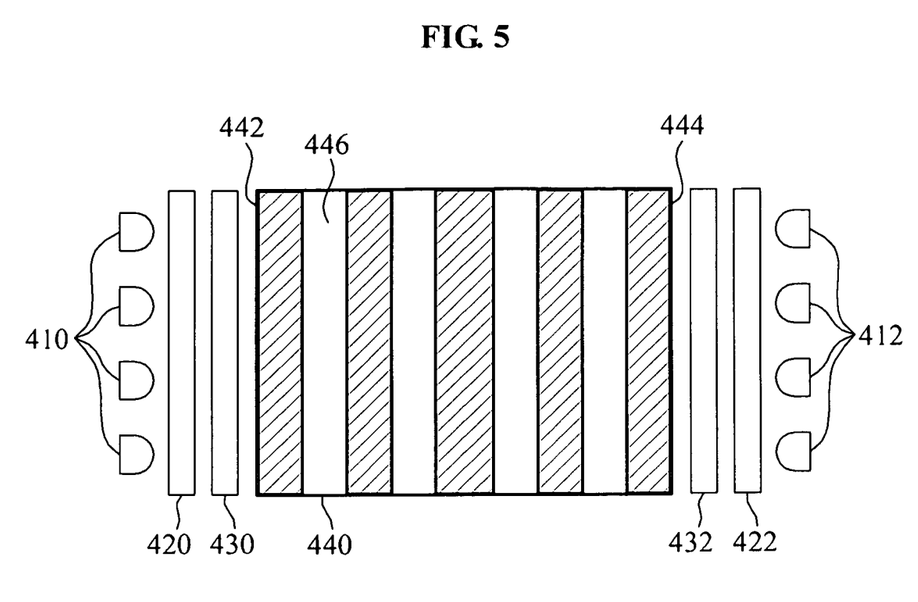
FIG. 5 illustrates a top-view of a CD BLU according to example embodiments.

FIG. 5 illustrates a top-view of a CD BLU 440 according to example embodiments.

Each of the light source 410 of the left side of the patterned BLU 440 and the light source 412 of the right side of the patterned BLU 440 may include an array of a plurality of light sources.

When a collimated light generated from the array of the plurality of light sources is projected to the patterned BLU 440, the holographic 3D image apparatuses 100 and 300 may provide a holographic image with a high luminance.

Figure 6:
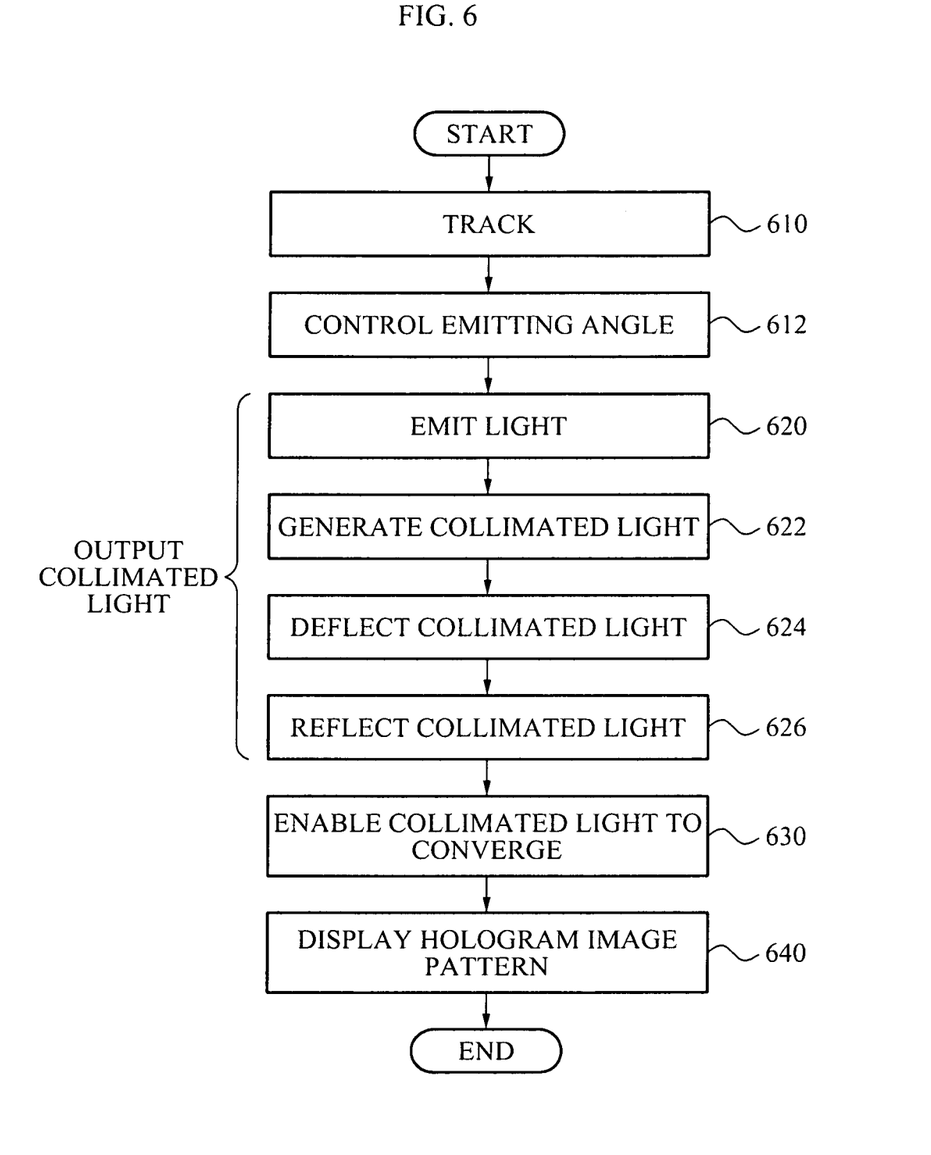
FIG. 6 illustrates a holographic 3D image generating method.

FIG. 6 illustrates a holographic 3D image generating method.

In operation 610, the tracking unit 320 may track a location of at least one eye of a viewer of a holographic 3D image, and information for identifying the location of the at least one eye may be generated. The generated information may be used for operation 612 where an emitting angle is controlled as an example.

In operation 612, the controller 310 may adjust an emitting angle of a collimated light to enable a modulated light wave to be emitted towards the location of the at least one eye of the viewer. The emitting angle may indicate an emitting angle of a collimated light in operations for outputting the collimated light.

In the operations for outputting the collimated light, that is, operations 620 through 626, a collimated light of a predetermined emitting angle may be outputted by the CD BLU 110.

In operation 620, a light generating device, for example, the light sources 410 and 412, may emit light.

In operation 622, the collimating lens, for example, the collimating lenses 420 and 422, may collimate the emitted light to generate the collimated light.

In operation 624, a collimated light deflection device, for example, collimated light deflection devices 430 and 432, may deflect the collimated light.

In operation 626, a collimated light reflection device, for example, the patterned BLU 440, may reflect the deflected collimated light, and the reflected collimated light may be outputted at the emitting angle.

The deflection may be performed by the collimated light deflection device that performs collimated light deflecting action. The collimated light deflection device may deflect the collimated light by changing a shape or a spatial location of the collimated light deflection device. Therefore, an incident angle of the deflected collimated light to the collimated light reflection device may be adjusted by the collimated light deflection device.

The incident angle of the deflected collimated light to the collimated light reflection device may be controlled by applying mechanical action or electrical action to the collimated light deflection device. The mechanical action may be applicable when the collimated light deflection device is a rotation prism, for example, and the electric action may be applicable when the collimated light deflection device is an electrowetting prism or a liquid crystal, for example.

A midpoint of a range of emitting angles of reflected collimated light reflected from the collimated light reflection device may be perpendicular to a midpoint of a range of incident angles of deflected collimated light to the collimated light reflection device.

A holographic 3D image apparatus may include two light generating devices, two collimated light generating devices, and two collimated light deflection devices in an embodiment.

A first collimated light generated by a first light generating device and a first collimated light generating device and a second collimated light generated by a second light generating device and a second collimated light generating device may face each other.

A first incident adjusting device may include the first light generating device, the first collimated light generating device, and a first collimated light deflection device, and a second incident adjusting device may include the second light generating device, the second collimated light generating device, and a second collimated light deflection device.

In operations 620 through 626, the first incident angle adjusting device and the second incident angle adjusting device may be used by performing time division, and the first collimated light and the second collimated light may be alternately outputted by performing the time division.

The first collimated light deflection device may adjust the incident angle of the collimated light to the collimated light reflection device to enable a focused beam to be emitted towards a location of at least one eye of the viewer, and the second collimated light deflection device may adjust the incident angle of the collimated light to the collimated light reflection device to enable the focused beam to be emitted towards a location of the other eye of the viewer.

In operation 630, the convergent lens 120 may enable the collimated light to converge into a viewing area of the viewer, and a viewing window may be generated.

In operation 640, the SLM 130 may display a holographic image pattern obtained by combining diffractive lenses.

As described above, the emitting angle of the collimated light may be adjustable, and the holographic image pattern may generate a focused beam by performing spatially-varying modulation with respect to the collimated light converging into the viewing area.

A holographic 3D image apparatus described with reference to FIGS. 1 through 5 may be applicable to the holographic 3D image generating method and thus, detailed descriptions thereof are omitted.

The method according to the above-described embodiments may be recorded in non-transitory computer-readable media including program instructions to implement various operations embodied by a computer. The media may also include, alone or in combination with the program instructions, data files, data structures, and the like.

Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules or units described herein may be executed by a dedicated processor unique to that unit or by a processor common to one or more of the modules. The described methods may be executed on a general purpose computer or processor or may be executed on a particular machine such as the holographic 3D image apparatus described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A holographic three-dimensional (3D) image apparatus for generating a holographic 3D image, the apparatus comprising:
   a collimated directional backlight unit (CD BLU) to output a first collimated light; and
   a convergent lens to converge the first collimated light into a viewing area of a viewer of the holographic 3D image,
   wherein the first collimated light illuminates a spatial light modulator (SLM) that displays a holographic image pattern to perform spatially-varying modulation to the first collimated light,
   wherein the CD BLU comprises a light source to emit light, a collimating lens to collimate the light emitted by the light source to output a second collimated light, a collimated light deflection device to deflect the second collimated light to output a third collimated light and a patterned backlight unit to reflect the third collimated light to be outputted from a plurality of trapezoidal-shaped openings of the patterned backlight unit as the first collimated light, and wherein the collimated light deflection device adjusts the third collimated light incident to a surface of the patterned backlight unit by changing a shape of the collimated light deflection device or a spatial-location of the collimated light deflection device, so that the emitting angle of the first collimated light that projects out the CD BLU and enters the SLM is adjustable.

2. The apparatus of claim 1, further comprising:

a controller to control the CD BLU to adjust the emitting angle of the first collimated light, wherein the controller adjusts the emitting angle of the first collimated light to enable the modulated light to be emitted towards a location of at least one eye of the viewer.

3. The apparatus of claim 2, further comprising:

a tracking unit to track the location of the at least one eye to generate location information of the at least one eye, wherein the tracking unit provides the controller with the location information of the at least one eye.

4. The apparatus of claim 1, wherein the collimated light deflection device is at least one of a rotation prism, an electrowetting prism, and a liquid crystal.

5. The apparatus of claim 1, wherein the CD BLU further comprises a first incident angle adjusting unit and a second incident angle adjusting unit, wherein the first incident angle adjusting unit includes the light source as a first light source, the collimating lens as a first collimating lens and the collimated light deflection device as a first collimated light deflection device, wherein the second incident angle adjusting unit includes a second light source, a second collimating lens, and a second collimated light deflection device, and wherein the first incident angle adjusting unit and the second incident angle adjusting unit are located symmetrically with respect to the patterned BLU.

6. The apparatus of claim 5, wherein the first light source and the second light source emit light in alternate time slots by performing time division with respect to the first light source and the second light source.

7. The apparatus of claim 5, wherein:

the first incident adjusting unit adjusts the emitting angle of the first collimated light to enable the converged first collimated light to be emitted towards a location of an eye of the viewer; and the second incident adjusting unit adjusts the emitting angle of another collimated light from the second light source to enable the another collimated light to be emitted towards a location of the other eye of the viewer.

8. The apparatus of claim 1, wherein the convergent lens is at least one of a refractive lens and a diffractive lens.

9. A method of generating a holographic three-dimensional (3D) image, the method comprising:

outputting a collimated backlight at a predetermined emitting angle from a collimated directional backlight unit (CD BLU);

converging the output collimated backlight into a viewing area of a viewer of the holographic 3D image; and displaying a holographic image pattern using a spatial fight modulator (SLM) to perform spatially-varying modulation to the collimated backlight, wherein the collimated backlight illuminates the SLM, wherein the outputting comprises, emitting a light using a light generating device;

generating a collimated light by collimating the light;

deflecting the collimated light by a collimated light deflection device; and reflecting the deflected collimated light to be outputted from a plurality of trapezoidal-shaped openings of the CD BLU as the collimated backlight by the collimated light deflection device, wherein the deflecting adjusts the deflected collimated light incident to a surface of the CD BLU by changing a shape of the collimated light deflection device or a spatial-location of the collimated light deflection device, so that the emitting angle of the collimated backlight that projects out the CD BLU and enters the SLM is adjustable.

10. The method of claim 9, further comprising:

controlling the emitting angle to enable the modulated light wave to be emitted towards a location of at least one eye of the viewer.

11. The method of claim 10, further comprising:

tracking the location of the at least one eye to generate information for identifying the location of the at least one eye, wherein the information for identifying the location of the at least one eye is used when the controlling of the emitting angle is performed.

12. The method of claim 9, wherein the deflecting controls the incident angle of the deflected collimated light to the surface of the CD BLU by applying at least one of a mechanical action or an electrical action to the surface of the CD BLU.

13. The method of claim 9, wherein:

the CD BLU comprises two light generating devices, two collimated light generating devices, and two collimated light deflection devices; and a first collimated light generated by a first light generating device and a first collimated light generating device and a second collimated light generated by a second light generating device and a second collimated light generating device face each other.

14. The method of claim 13, wherein:

a first incident adjusting device comprises the first light generating device, the first collimated light generating device, and a first collimated light deflection device; and a second incident adjusting device comprises the second light generating device, the second collimated light generating device, and a second collimated light deflection device, wherein the first collimated light and the second collimated light are alternately emitted by performing time division with respect to the first incident angle adjusting device and the second incident angle adjusting device.

15. The method of claim 13, wherein:

the first collimated light deflection device adjusts the incident angle of the deflected collimated light from the first light generating device as the light generating device to the surface of the CD BLU to enable the converged collimated backlight to be emitted towards the location of an eye of the viewer; and the second collimated light deflection device adjusts the incident angle of another deflected collimated light from the second light generating device to the surface of the CD BLU to enable the another deflected collimated light to be emitted towards the location of the other eye of the viewer.

16. A non-transitory computer-readable medium comprising a program for instructing a computer to perform the method of claim 9.

* * * * *